Nov. 2, 1965  B. C. KEMPSON  3,214,911
HYDRAULIC APPARATUS
Filed June 1, 1964
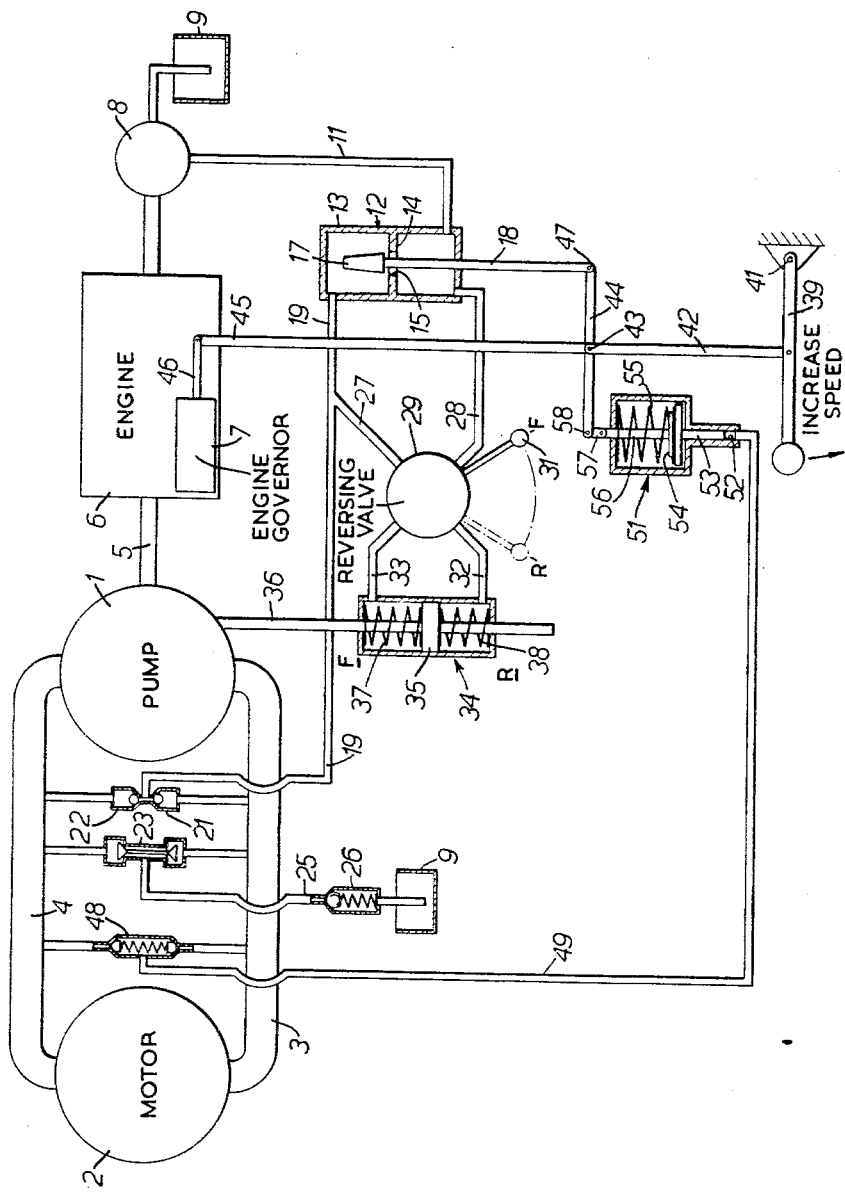
INVENTOR
BERTRAM C. KEMPSON
BY Reynolds & Christensen
ATTORNEYS United States Patent Office 3,214,911
Patented Nov. 2, 1965

3,214,911
HYDRAULIC APPARATUS
Bertram C. Kempson, St. Marks, Cheltenham, England, assignor to Dowty Hydraulics Units Limited, near Cheltenham, England, a British company
Filed June 1, 1964, Ser. No. 371,407
Claims priority, application Great Britain, June 4, 1963, 22,205
3 Claims. (Cl. 60—53)

This invention relates to hydraulic apparatus and more particularly to an infinitely variable speed ratio hydrostatic power transmission comprising a positive displacement hydraulic pump in hydraulic connection with a positive displacement hydraulic motor, the displacements of the pump and/or the motor being variable in order that the speed ratio of the transmission may be variable. For the purpose of this specification the speed ratio of a hydrostatic transmission is the ratio of the motor speed to the pump speed and is thus equivalent to the ratio of the pump displacement to the motor displacement. The speed ratio may thus be represented as a fraction in which pump displacement is the numerator and motor displacement is the denominator.

In accordance with the present invention a control for an infinitely variable speed ratio hydrostatic power transmission comprises an auxiliary fixed displacement hydraulic pump mechanically driven in fixed speed relation with the transmission pump, a variable throttle through which the delivery of the fixed displacement pump is arranged to pass, pressure responsive means to adjust the throttle in accordance with the hydraulic pressure generated by the transmission pump, and speed ratio adjusting means for the transmission operable to select a speed ratio in accordance wtih the pressure drop at the throttle, such that increase of hydraulic pressure generated by the transmission pump will reduce speed ratio and vice-versa and such that speed ratio will increase with increase in auxiliary pump speed and vice-versa.

A regulator may be provided for selecting speed ratio by selecting the size of the throttle the transmission pressure responsive means being arranged to alter the selected size of the throttle in an overriding manner when the transmission presure exceeds a predetermined value whereby to cause reduction of speed ratio selected by the regulator.

The regulator and the transmission pressure responsive means may act through the medium of a floating lever on the throttle in such manner that the throttle is adjusted in accordance with the difference of the individual adjusting movements of the regulator and the pressure responsive means.

One embodiment of the invention will now be described with reference to the accompanying drawing in which the embodiment is shown diagrammatically.

The transmission comprises a transmission pump 1 of variable positive displacement, a transmission motor 2 of fixed positive displacement and a pair of hydraulic passages 3 and 4 connected to carry flow and return liquid between the pump 1 and the motor 2. The pump 1 is driven through a drive shaft 5 from an engine 6. The engine 6 is controlled by a governor 7 of conventional construction which acts to control engine speed by controlling the fuel flow to the engine. The engine 6 also drives a small auxiliary pump 8 of the fixed displacement type through the shaft 5. Preferably this pump is a gear pump.

The pump 8 draws liquid from a reservoir 9 and delivers it to the pipe 11. The pipe 11 connects to a throttle unit 12 comprising a casing 13 having a partition 14 dividing it into two chambers, an orifice 15 in the partition and a tapered needle 17 movable axially through the orifice 15. The needle 17 is mounted on a slidable rod 18 carried by a suitable seal in the casing 13. The delivery from the pump 8 passes through the orifice 15 as adjusted by the tapered needle 17 and leaves the unit 12 through a pipe 19. The pipe 19 is connected to a pair of non-return valves 21 and 22 which are connected respectively to the pipe lines 3 and 4. The valves 21 and 22 serve the purpose of ensuring that the delivered liquid in the pipe 19 enters the pipe 3 or the pipe 4 which is at the lower pressure. The liquid delivered into the pipe at lower pressure compensates for leakages from the transmission. Any excess of liquid over and above the leakages leaves the transmission through a shuttle valve 23 connected to pipes 3 and 4, the shuttle valve again selecting the pipe at lower pressure. From this shuttle valve liquid flows through a pipe 25 to a low pressure relief valve 26. The low pressure relief valve 26 delivers liquid to the reservoir 9 and serves to determine the value of the low pressure in the pipe line 3 or 4 at the lower pressure.

The pressure drop at the orifice 15 in the throttle valve 12 is fed through pipes 27 and 28 to a reversing valve 29 having a control handle 31. From the reversing valve 29 pipes 32 and 33 extend to either end of a servo cylinder 34. Within the servo cylinder 34 is a piston 35 having a piston rod 36 extending through one end of the cylinder 34 to the transmission pump 1. Longitudinal movement of the rod 36 will control the displacement of the transmission pump 1. In the central position of the piston 35 as illustrated the pump 1 will be at zero displacement. Movement in the upward sense as seen in the drawing serves to increase pump displacement in the forward direction and movement in the downward sense as seen in the drawing, serves to increase pump displacement in the reverse direction. Within the servomotor cylinder 34 a pair of compression springs 37 and 38 are located which act in compression on the piston 35 and urge it towards the central position shown in the drawing. The pressure difference at the orifice 15 may be fed to the cylinder 34 in the sense to move the piston either upwardly or downwardly as seen in the drawing depending on the position of the reversing valve 29 as controlled by the handle 31.

For controlling the engine and the transmission a control lever 39 is provided secured to the fixed fulcrum 41. From the lever 39 a link 42 extends, being connected at its opposite end to a pivot 43 carried at the centre of a floating lever 44. From the pivot 43 a further link 45 extends to a control lever 46 of the governor 7. One end of the floating lever 44 is pivotally connected at 47 to the rod 18 carrying the tapered needle 17.

For responding to the transmission pressure a shuttle valve 48 is connected between the pipe lines 3 and 4 to select the pipe line at the higher pressure and to connect it to a pipe 49. The pipe 49 is connected to a transmission pressure responsive unit 51. Within the unit 51 there is provided a small diameter cylinder 52 within which is located a piston 53. The piston 53 carries a spring end cap 54 against which reacts a strong compression spring 55. A control rod 56 extends from the end cap 54 from the unit 51 to a pivoted link 57 which in turn is connected to a pivot 58 at the end of the floating lever 44 opposite to the pivot 47.

When the embodiment described is in operation rotation of the engine 6 drives the transmission pump 1 which in turn displaces liquid through the pipes 3 and 4 to rotate the transmission motor 2. The motor 2 will be connected to a load which it is desired to drive. The engine 6 will also rotate the pump 8 and liquid will be delivered to the pipe 11 at a rate in proportion to the rotational speed of both the engine 6 and the pump 1. The delivery from the pump 8 will pass through the orifice 15 into the pipe 19 from whence it will pass to one or the other of the non-return valves 21 and 22 into one of the pipes 3 or 4 at the lower pressure. Excess of the liquid entering the transmission over and above the leakage will leave the transmission pipe lines 3 and 4 through the medium of the shuttle valve 23 and will be maintained at a predetermined low pressure by the relief valve 26. The loading of the relief valve determines such low pressure and liquid having passed through the relief valve will flow into the reservoir 9.

As shown in FIGURE 1 the controls are in the condition corresponding to idling speed. In this speed the lever 39 and the spring 55 will act through the floating lever 44 to hold the tapered needle 17 just clear of the orifice 15. Liquid delivered from the pump 8 passing through the orifice 15 will then produce substantially no pressure drop. In order to propel the vehicle forwardly the reversing valve 29 is selected into the forward position and the lever 39 is moved to increase speed. Such movement of the lever 39 through the medium of the links 42 and 45 will increase the speed setting of the engine governor 7 and will move the tapered needle 17 downwardly as shown in the drawing so that the tapered needle enters the orifice 15. As the engine speed increases to the speed determined by the governor 7 a substantial pressure drop will be developed at the orifice 15. Such pressure drop is fed through the reversing valve 29 to the servo motor 34 and is applied to the servo motor 34 to urge the rod 36 upwardly as seen in the drawings to give forward displacement to the pump 1. As the engine approaches the speed determined by the governor 7 the pressure drop at the orifice 15 will be such as to cause maximum movement of the piston 35 against the loading of the springs 37 and 38. Closure of the coils of one of the springs 37 and 38 will form an effective end stop against further movement of the piston 35. The engine governor controls engine speed by operating on the fuel flow in the sense to tend to maintain engine speed to a selected value. With increase in load placed on the motor 2 a greater torque will be required to be exerted by the engine 6 on the pump 1, and fuel flow to the engine will be increased by the governor 7 to give such increased torque. When fuel flow to the engine reaches a maximum value the governor 7 can increase fuel no further and such speed is taken to be the predetermined speed as selected by lever 39 for the governor 7. If the load on the motor 2 increases still further the engine speed will drop below the predetermined value. It is arranged that for any setting of the control lever 39 that when the engine runs at the predetermined speed the pressure drop at the orifice 15 is just sufficient to completely deflect the piston 35 to one end stop to give a full displacement to the pump 1. Any drop in engine speed below the selected speed will cause loss of pressure drop at the orifice 15 which will permit the piston 35 to move towards its central position under the action of the springs 37 and 38. In turn this will reduce displacement of the pump 1 which will prevent any increase in torque required by the engine 6 to drive the pump 1.

The operation as so far described is based on the assumption that the spring 54 maintains the spring end cap 54 firmly against one end of the casing of the pressure responsive unit 51. If during any operation of the engine and transmission the higher pressure in the transmission should exceed a maximum safe value, such pressure acting through pipe 49 on the piston 53 will be capable of moving piston 53 and the end cap 54 against the loading of the spring 54. Such movement will tend to move the tapered needle 17 downwardly as seen in the drawing to reduce the pressure drop occurring at the orifice 15 and so to permit piston 35 to be moved towards the central position by the springs 37 and 38 to reduce the displacement of the pump 1. Such action will reduce the high pressure in the transmission although at the same time it will reduce the speed ratio of the transmission also. Excessively high pressures in the transmission are normaly likely to occur only during small displacements of the pump when the engine is running below the predetermined speed selected by the control lever 39. It will be seen therefore that the floating lever 44 enables two controlling movements to be applied to the tapered needle 17. The first of these is the normal controlling movement of the lever 39 to set the effective aperture of the throttle orifice 15. The second of these is as a result of excessive pressure in the transmission when the effective aperture of the orifice 15 is increased in order to cause reduction of pump displacement.

I claim as my invention:

1. In combination with an infinitely variable speed ratio hydrostatic power transmission comprising a positive displacement hydraulic transmission pump in hydraulic connection with a positive displacement hydraulic transmission motor in which at least one of the displacements of the pump and the motor is variable to vary the speed ratio between the transmission pump and the transmission motor; a fixed displacement hydraulic pump mechanically driven in a fixed speed relation with the transmission pump, a variable throttle through which delivery of the fixed displacement pump is arranged to pass, pressure responsive means to adjust the throttle in accordance with hydraulic pressure generated by the transmission pump, and speed ratio adjusting means for the transmission operable to select a speed ratio in accordance with pressure drop at the throttle such that increase of hydraulic pressure generated by the transmission pump will reduce speed ratio and vice versa and such that speed ratio will increase with pump speed and vice versa.

2. The combination as claimed in claim 1, including a regulator for selecting speed ratio by selecting the size of the throttle, the pressure responsive means being arranged to alter the selected size of the throttle in an overriding manner when the transmission pressure exceeds a predetermined value whereby to cause reduction of the speed ratio selected by the regulator.

3. The combination as claimed in claim 2, wherein the regulator and the transmission pressure responsive means act through the medium of a floating lever on the throttle in such manner that the throttle is adjusted in accordance with the difference of the individual adjusting movements of the regulator and the pressure responsive means.

No references cited.

JULIUS E. WEST, *Primary Examiner.*

UNITED STATES PATENT OFFICE
CERTIFICATE OF CORRECTION

Patent No. 3,214,911                  November 2, 1965

Bertram C. Kempson

It is hereby certified that error appears in the above numbered patent requiring correction and that the said Letters Patent should read as corrected below.

In the grant, lines 2 and 12, and in the heading to the printed specification, line 4, for "Dowty Hydraulics Units Limited", each occurrence, read -- Dowty Hydraulic Units Limited --.

Signed and sealed this 14th day of June 1966.

(SEAL)
Attest:

RNEST W. SWIDER                        EDWARD J. BRENNER
ttesting Officer                           Commissioner of Patents